(12) United States Patent
Zhang

(10) Patent No.: US 11,988,908 B2
(45) Date of Patent: May 21, 2024

(54) NANOCOMPOSITE PARTICLE AND MAGNETRON DISPLAY DEVICE

(71) Applicant: TCL CHINA STAR OPTOELECTRONICS TECHNOLOGY CO., LTD., Shenzhen (CN)

(72) Inventor: Yu Zhang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 863 days.

(21) Appl. No.: 17/050,143

(22) PCT Filed: Aug. 4, 2020

(86) PCT No.: PCT/CN2020/106845
§ 371 (c)(1),
(2) Date: Oct. 23, 2020

(87) PCT Pub. No.: WO2022/007079
PCT Pub. Date: Jan. 13, 2022

(65) Prior Publication Data
US 2023/0112469 A1  Apr. 13, 2023

(30) Foreign Application Priority Data

Jul. 7, 2020 (CN) .......................... 202010645157.5

(51) Int. Cl.
*G02F 1/09* (2006.01)
*C09C 1/24* (2006.01)
(Continued)

(52) U.S. Cl.
CPC ................ *G02F 1/092* (2013.01); *C09C 1/24* (2013.01); *C09C 3/063* (2013.01); *B82Y 20/00* (2013.01); *B82Y 25/00* (2013.01); *B82Y 40/00* (2013.01); *C01P 2004/16* (2013.01); *C01P 2004/64* (2013.01); *C01P 2006/42* (2013.01); *G02F 2202/36* (2013.01); *G02F 2203/02* (2013.01); *G02F 2203/48* (2013.01)

(58) Field of Classification Search
CPC .......... G02F 1/09; G02F 1/092; G02F 1/0081; G02F 1/0105; G02F 1/01791
See application file for complete search history.

(56) References Cited

U.S. PATENT DOCUMENTS 10,462,919 B2   10/2019   Wang et al.
2018/0348577 A1*  12/2018   Pousthomis ...... G02F 1/133514

FOREIGN PATENT DOCUMENTS

CN    1693411 A    11/2005
CN    101013620 A    8/2007
(Continued)

*Primary Examiner* — Joseph P Martinez
(74) *Attorney, Agent, or Firm* — PV IP PC; Wei Te Chung; Zhigang Ma

(57) ABSTRACT

A nanocomposite particle and a magnetron display device are disclosed. The nanocomposite particle includes a magnetic core, and a first protection layer and a luminescent that sequentially cover the magnetic core. A length of the nanocomposite particle in a long axis direction is different from a length of the nanocomposite particle in a short axis direction.

12 Claims, 2 Drawing Sheets

(51) Int. Cl.
*C09C 3/06* (2006.01)
*B82Y 20/00* (2011.01)
*B82Y 25/00* (2011.01)
*B82Y 40/00* (2011.01)

(56) References Cited

FOREIGN PATENT DOCUMENTS

| | | | |
|---|---|---|---|
| CN | 102822085 | A | 12/2012 |
| CN | 103235460 | A | 8/2013 |
| CN | 103834323 | A | 6/2014 |
| CN | 105511150 | A | 4/2016 |
| CN | 105602227 | A | 5/2016 |
| CN | 107861185 | A | 3/2018 |
| CN | 108493318 | A | 9/2018 |
| CN | 108822846 | A | 11/2018 |
| CN | 110041912 | A | 7/2019 |
| CN | 111048671 | A | 4/2020 |

* cited by examiner

NANOCOMPOSITE PARTICLE AND MAGNETRON DISPLAY DEVICE

The present disclosure is a National Phase of PCT Patent Application No. PCT/CN2020/106845 having international filing date of Aug. 4, 2020, which claims priority to Chinese Patent Application No. 2020106451575, filed on Jul. 7, 2020, filed for the invention title "blacklight module and method of manufacturing thereof", which is hereby incorporated by reference in its entirety.

FIELD OF INVENTION

The present application relates to the field of display technologies, and in particular to a nanocomposite particle and a magnetron display device.

BACKGROUND OF INVENTION

Smart glass (electrochromic glass) has broad application prospects in many fields. For example, the smart glass may be used in business applications as projection screens. The smart glass in place of curtains plays a role of partition and privacy protection, insulates sounds and cancels noises in residentials and medical institutions, or plays an anti-theft function in museums, exhibition halls, and banks based on phase transition. Currently, polymer dispersed liquid crystal (PDLC) is widely used in the field of smart glass. However, PDLC used as a dimming layer of the smart glass cannot display color images, which limits the development of the smart glass.

SUMMARY OF INVENTION

Technical Problems

Magnetic nanorods (please refer to "Single-Stimulus-Induced Modulation of Multiple Optical Properties", Advanced. Materials, Hai Li), used as a kind of smart optical material, have excellent anisotropic optical properties, where optical properties can be controlled by a magnetic field. Upon the driving of a magnetic field, the arrangement direction of the magnetic nanorods changes, resulting in a change of transmittance, so that relying on the phase transition of the magnetic particles, the magnetic nanorods exhibit the same photoelectric properties as the PDLC. However, the displayed image color controlled by the magnetic nanorods is still limited, and can only be the structural color reflected by the assembly of nanoparticles. Thus, providing a color intelligent switchable glass that can change multiple colors and be controlled by a magnetic field is a problem to be solved urgently.

Technical Solutions

The present application provides a nanocomposite particle used for magnetron luminescence and a magnetron display device, so as to solve the technical problem that the displayed image color controlled by magnetic nanorods is limited.

The present application provides a nanocomposite particle for magnetron luminescence, comprising: a magnetic core, and further comprising: a first protection layer, a luminescent layer, and a second protection layer sequentially covering the magnetic core, wherein a length of the nanocomposite particle in a long axis direction is different from a length of the nanocomposite particle in a short axis direction;

material of the luminescent layer is up-conversion material or quantum dot material.

In the nanocomposite particle for magnetron luminescence of the present application, material of the second protection layer is phenol formaldehyde resin or silicon dioxide.

In the nanocomposite particle for magnetron luminescence of the present application, material of the magnetic core is selected from magnetic material containing at least one of Fe, Ni, and Co; and material of the first protection layer is phenol formaldehyde resin or silicon dioxide.

In the nanocomposite particle for magnetron luminescence of the present application, the material of the magnetic core is selected from magnetic material containing Fe.

In the nanocomposite particle for magnetron luminescence of the present application, the material of the magnetic core is $Fe_3O_4$.

In the nanocomposite particle for magnetron luminescence of the present application, a shape of the nanocomposite particle is rod-like, fusiform, or ellipsoidal.

The present application further provides a nanocomposite particle for magnetron luminescence, comprising: a magnetic core, and further comprising: a first protection layer and a luminescent layer sequentially covering the magnetic core, wherein a length of the nanocomposite particle in a long axis direction is different from a length of the nanocomposite particle in a short axis direction.

In the nanocomposite particle for magnetron luminescence of the present application, the nanocomposite particle further comprises a second protection layer which covers the luminescent layer.

In the nanocomposite particle for magnetron luminescence of the present application, wherein material of the second protection layer is phenol formaldehyde resin or silicon dioxide.

In the nanocomposite particle for magnetron luminescence of the present application, material of the magnetic core is selected from magnetic material containing at least one of Fe, Ni, and Co; and material of the first protection layer is phenol formaldehyde resin or silicon dioxide.

In the nanocomposite particle for magnetron luminescence of the present application, wherein material of the luminescent layer is up-conversion material or quantum dot material.

In the nanocomposite particle for magnetron luminescence of the present application, a shape of the nanocomposite particle is rod-like, fusiform, or ellipsoidal.

The present application further provides a magnetron display device, comprising: a first substrate and a second substrate disposed oppositely, wherein the magnetron display device comprises a dimming layer disposed between the first substrate and the second substrate;

wherein the dimming layer includes a plurality of nanocomposite particles, each of which includes a magnetic core, and further includes a protection layer and a luminescent layer sequentially covering the magnetic core, and a length of the nanocomposite particle in a long axis direction is different from a length of the nanocomposite particle in a short axis direction.

In the magnetron display device of the present application, wherein material of the luminescent layer is up-conversion material or quantum dot material.

In the magnetron display device of the present application, wherein a shape of the nanocomposite particles is rod-like, fusiform, or ellipsoidal.

In the magnetron display device of the present application, wherein when the nanocomposite particles are in a disorderly arrangement state, the dimming layer has a first transmittance, and the magnetron display device is in an atomized state without displaying an image; and when the nanocomposite particles are in a first arrangement state, the dimming layer has a second transmittance, and the magnetron display device is in a non-atomized state with displaying a first image.

In the magnetron display device of the present application, a side of the second substrate away from the dimming layer is a light incident side; and the magnetron display device further comprises a reflective layer which is disposed on a side of the first substrate close to the dimming layer.

In the magnetron display device of the present application, a side of the first substrate away from the dimming layer is a light incident side, and the magnetron display device further comprises a backlight unit which is disposed on the light incident side.

In the magnetron display device of the present application, the backlight unit includes a backlight source; and material of the luminescent layer is up-conversion material, and light emitted by the backlight source is a combination of infrared light and/or visible light; or material of the luminescent layer is a quantum dot material, and light emitted by the backlight source is blue light.

In the magnetron display device of the present application, both of the first substrate and the second substrate are glass substrates.

Beneficial Effect

In the nanocomposite particle for magnetron luminescence provided by the present application, the first protection layer and the luminescent layer covers the magnetic core, and a length of the nanocomposite particle in the long axis direction is different from a length in the short axis direction. Accordingly, under the stimulation of external light and the driving of external magnetic field, the arrangement orientation of the nanocomposite particles can change with the change of the direction of the external magnetic field, and then the magnetic core in the nanocomposite particle is excited to emit partial color light. Compared to the nanocomposite particles in the prior art, in the present application, by coating a luminescent layer outside the magnetic core, the luminescence color of the luminescent layer and the luminescence color of the magnetic core can be compounded, so as to enrich the luminescence color of the nanocomposite particle, thereby enriching the colorfulness of the nanocomposite particle applied to magnetron luminescence.

DESCRIPTION OF DRAWINGS

In order to more clearly illustrate the technical solution in the embodiment of the present application, the drawings necessary in the description of the embodiment will be introduced briefly below. Obviously, the drawings in the following description are only some embodiments of the present application, and for those ordinary skilled in the art, other drawings can be further obtained based on these drawings without creative works.

DETAILED DESCRIPTION OF PREFERRED EMBODIMENTS

Figure 1:
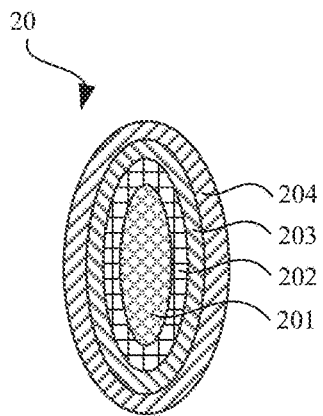
FIG. 1 is a schematic diagram of a cross-sectional structure of a nanocomposite particle provided by an embodiment of the present application.

The technical solutions of the embodiments of the present application will be clearly and completely described below in conjunction with the drawings in the embodiments of the present application. Obviously, the embodiments described are merely part of the embodiments of the present disclosure, instead of all of the embodiments. Based on the embodiments of the present application, all other embodiments obtained by those of ordinary skill in the art without creative work also fall within the scope of protection of the present application.

In the description of the present application, it should be noted that, azimuth or positional relationships indicated by terms "center", "longitudinal", "horizontal", "length", "width", "thickness", "upper", "lower", "front", "back", "left", "right", "vertical", "level", "top", "bottom", "inner", "outer", "clockwise" and the like is based on the azimuth or positional relationship shown in the drawings, which is only for ease of description of the present application and simplification of the description, rather than indicating or implying that the device or element referred to must have a specific orientation, or must be constructed and operated in a particular orientation, and therefore cannot be construed as limiting the present application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of this application, "a plurality of" means two or more than two, unless otherwise specifically defined.

In the description of the present application, unless expressly stipulated and defined otherwise, terms "installation", "connection" or "bonding" should be broadly understood. For example, it may be a fixed connection, a detachable connection, or an integral connection. It may be a mechanical connection, an electrical connection, or a communication with each other. It may be directly connected, indirectly connected through an intermediate medium. Further, it may be a communication within two elements, or an interaction between two elements. The specific meanings of the above terms in the present application may be understood by those of ordinary skill in the art in light of specific circumstances.

In the present application, unless stipulated or limited otherwise, a first feature is "on" or "below" a second feature may include an embodiment in which the first feature is in direct contact with the second feature, and may also include an embodiment in which the first feature and the second feature are not in direct contact with each other, but are in contact via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. A first feature "below," "under," or "on bottom of" a second feature may include an embodiment in which the first feature is right or obliquely "below," "under," or "on bottom of" the second feature, or just means that the first feature is at a height lower than that of the second feature.

The following disclosure provides a plurality of different embodiments or examples to implement different structures of the present application. To simplify the disclosure of the present application, the following describes components and settings in particular examples. Certainly, the examples are merely for illustrative purposes, and are not intended to limit this application. In addition, in the present application, reference numerals and/or reference letters may be repeated in different examples. This repetition is for the purpose of simplicity and clarity, and does not in itself indicate a relationship between the various embodiments and/or arrangements that are discussed. In addition, this application provides examples of various particular processes and materials, but a person of ordinary skill in the art will recognize that other processes and/or materials may be applied and/or used.

Please refer to FIG. 1. FIG. 1 is a schematic diagram of a cross-sectional structure of a nanocomposite particle provided by an embodiment of the present application.

The embodiment of the present application provides a nanocomposite particle 20 for magnetron luminescence. The nanocomposite particle 20 comprises a magnetic core 201, and further comprises a first protection layer 202 and a luminescent layer 203 sequentially covering the magnetic core 201. A length of the nanocomposite particle 20 in the long axis direction is different from a length of the nanocomposite particle in the short axis direction.

In the nanocomposite particle 20 for magnetron luminescence provided by the embodiment of the present application, the first protection layer 202 and the luminescent layer 203 covers the magnetic core 201, and a length of the nanocomposite particle 20 in the long axis direction is different from a length in the short axis direction. Accordingly, under the stimulation of external light and the driving of external magnetic field, the arrangement orientation of the nanocomposite particles 20 can change with the change of the direction of the external magnetic field, and then the magnetic core 201 in the nanocomposite particle 20 is excited to emit partial color light. In the present embodiment, by coating a luminescent layer 203 outside the magnetic core 201, the luminescence color of the luminescent layer 203 and the luminescence color of the magnetic core 201 can be compounded, so as to enrich the luminescence color of the nanocomposite particle 20, thereby enriching the colorfulness of the nanocomposite particle 20 applied to magnetron luminescence.

Specifically, a shape of the nanocomposite particle 20 is rod-like, fusiform, or ellipsoidal.

In the embodiment of the present application, the shape of the nanocomposite particle 20 is rod-like.

Specifically, in the nanocomposite particle 20, material of the magnetic core 201 is selected from magnetic material containing at least one of Fe, Ni, and Co.

In the embodiment of the present application, material of the magnetic core 201 is selected from magnetic material containing Fe. Specifically, material of the magnetic core 201 is $Fe_3O_4$.

Specifically, material of the first protection layer is phenol formaldehyde resin or silicon dioxide.

In the embodiment of the present application, material of the first protection layer 202 is phenol formaldehyde resin. Since the phenol formaldehyde resin has satisfactory high temperature resistance and chemical stability, it can maintain the dimensional stability and structural integrity of the magnetic core 201, so as to facilitate the formation of the structure of the magnetic core 201 with satisfactory morphology.

Specifically, the nanocomposite particle 20 further includes a second protection layer 204. The second protection layer 204 covers the luminescent layer 203. Material of the second protection layer 204 is phenol formaldehyde resin or silicon dioxide.

In the embodiment of the present application, material of the second protection layer 204 is silicon dioxide. An arrangement of the silicon dioxide layer can effectively improve the monodispersity of the nanocomposite particle 20, so as to avoid aggregation between particles, which is conducive to obtain the nanocomposite particle 20 with satisfactory morphology, thereby facilitating an improvement of the structural stability of the nanocomposite particle 20.

It should be noted that material of the first protection layer 202 can be other materials that possess a protection effect and can maintain the morphology of the magnetic core 201, while material of the second protection layer 204 can be other materials that have a protection effect and can improve the monodispersity of the nanocomposite particle 20. Material of the first protection layer 202 and material of the second protection layer 204 may be the same or different. Materials of the first protection layer 202 and the second protection layer 204 are not specifically limited to the present application.

Specifically, material of the luminescent layer 203 is up-conversion material or quantum dot material.

In the embodiment of the present application, when material of the luminescent layer 203 is up-conversion material, under the stimulation of external light and the driving of external magnetic field, by adjusting the direction of the magnetic field, the magnetic core 201 in the nanocomposite particle 20 emits different colors of light after being excited, while the luminescence color of the up-conversion material and the luminescence color of the magnetic core 201 will be compounded, so that the nanocomposite particle 20 can emit more colors of light, thereby enriching the luminescence color of the nanocomposite particle 20, and enriching the colorfulness of the nanocomposite particle 20 applied to magnetron luminescence.

It should be noted that the specific types of the up-conversion material can be selected according to actual application requirements, which are not specifically limited to the present application.

In the embodiment of the present application, when material of the luminescent layer 203 is quantum dot material, under the stimulation of external light and the driving of external magnetic field, by adjusting the direction of the magnetic field, the magnetic core 201 in the nanocomposite particle 20 emits different colors of light after being excited, while the luminescence color of the up-conversion material and the luminescence color of the magnetic core 201 are compounded, so that the nanocomposite particle 20 can emit more colors of light, thereby enriching the luminescence color of the nanocomposite particle 20, and enriching the colorfulness of the nanocomposite particle 20 applied to magnetron luminescence.

It should be noted that the quantum dot material can be perovskite quantum dots or cadmium sulfide quantum dots, etc. The selection of specific material can be determined according to actual application requirements, and the type of quantum dot material is not specifically limited to the present application. In addition, according to actual application requirements, electroluminescent or photoluminescent quantum dot materials can also be selected, which will not be repeated here.

In the embodiment of the present application, the method for preparing the aforementioned nanocomposite particles 20 for magnetron luminescence specifically includes the following steps:

S101: preparing the magnetic core 201 coated with the first protection layer 202.

First, a solvothermal method is used to prepare a ferric oxide nanorod with rod-like morphology and uniform size, where ferric chloride is the iron source, and sodium citrate is the reducing agent. The reaction solvent may be an organic solvent such as ethylene glycol.

Then, the sol-gel method is used, where resorcinol and formaldehyde are used as materials, and in a weakly alkaline solution, the ferric oxide nanorod is used as the core to from a phenol formaldehyde resin layer as the first protection layer 202 with the protection function. The weakly alkaline solution may be ammonium solution, which is used to adjust a pH value of the solution to maintain it at about 8. In addition, the weakly alkaline solution may also be other alkaline solutions used to adjust the pH value. The type of the weakly alkaline solution is not specifically limited to the present application.

Finally, under the reaction condition of 100° C., the ferric oxide nanorod is reduced by hydrogen to obtain the ferroferric oxide magnetic nanorod coated with the phenol formaldehyde resin layer. That is, the magnetic core 201 coated with the first protection layer 202 is obtained.

S102: forming the luminescent layer 203 outside the first protection layer 202.

Specifically, luminescent material is provided. The luminescent material is specifically up-conversion material or quantum dot material. The preparation method of the up-conversion material or the quantum dot material can refer to the prior art, which will not be repeated here.

The material of the luminescent layer 203 as the up-conversion material is taken as an example for illustration. Specifically, when sodium tetrafluoroyttrium is used as the host material in the up-conversion material and the doped rare earth element is ytterbium, the prepared oleic acid yttrium and the oleic acid ytterbium is in a ratio of 4:1 to prepare a oleic acid ytterbium yttrium solution, so as to obtain the precursor of the luminescent layer 203. Then, the ferroferric oxide coated with the phenol formaldehyde resin layer is dissolved in a small amount of a mixed solution of oleic acid and octadecene to obtain a mixed solution of ferroferric oxide magnetic nanorods. Then, under argon atmosphere, the above-mentioned mixed solution is heated to 280° C. at a rate of 20° C./min, and the oleic acid ytterbium yttrium solution is added by dropwise at 280° C., wherein a thickness of the luminescent layer 203 is adjusted by controlling the dropping rate, dropping amount, and dropping times of the solution. Finally, the above-generated product is centrifuged and precipitated, and then the solid mixture obtained by the centrifugation is washed with an organic solvent to remove the solvent, so that the ferroferric oxide for phenol formaldehyde resin magnetic nanorod coated with the luminescent layer 203 is obtained.

S103: coating the luminescent layer 203 with the second protection layer 204.

First, the magnetic core 201 coated with the first protection layer 202 and the luminescent layer 203 are ultrasonically dispersed in a solvent. The solvent may be a mixed solution of ethanol and water (with a volume ratio of 1:1). Then, an alkaline solution, such as ammonia solution is added to maintain the solution weakly alkaline and to maintain the pH around 9. Then, tetraethyl orthosilicate is added and mechanically stirred for 10 hours to obtain the crude nanocomposite particle 20.

Then, the crude nanocomposite particle 20 is purified. Specifically, firstly, the crude nanocomposite particle 20 is centrifuged. Then, the solid mixture obtained by the centrifugation is washed with ethanol. Finally, the solvent is evaporated to obtain the purified nanocomposite particle 20.

The nanocomposite particle 20 for magnetron luminescence provided by the embodiment of the present application is sequentially coated with the first protection layer 202, the luminescent layer 203, and the second protection layer 204 on the outside of the magnetic core 201, so as to obtain satisfactory morphology and stability. Under the stimulation of external light and the driving of external magnetic field, the arrangement orientation of the nanocomposite particle 20 can change with the change of the external magnetic field direction, so that the magnetic core 201 in the nanocomposite particle 20 is excited to emit partial color light. In the present embodiment, by coating a luminescent layer 203 outside the magnetic core 201, the luminescence color of the luminescent layer 203 and the luminescence color of the magnetic core 201 may be compounded, thereby enriching the luminescence color of the nanocomposite particle 20, and enriching the colorfulness of the nanocomposite particle 20 applied to magnetron luminescence.

Figure 2:
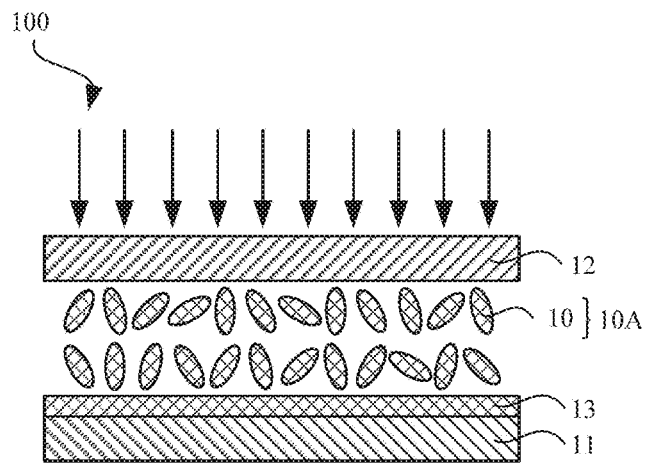
FIG. 2 is a schematic structural diagram of a magnetron display device in a disorderly arrangement state provided by a first embodiment of the present application.
Figure 3:
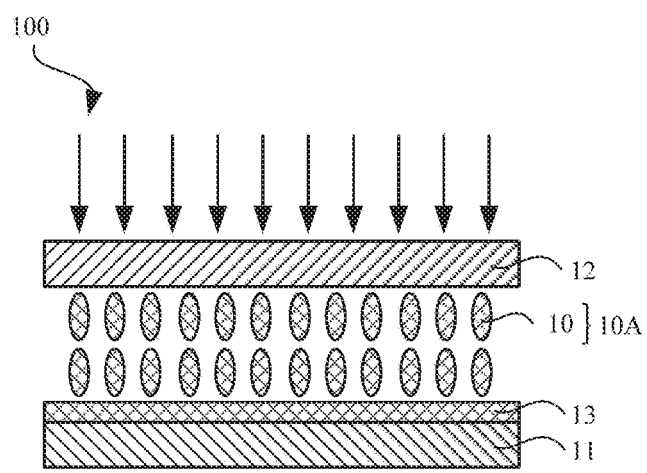
FIG. 3 is a schematic structural diagram of a magnetron display device in a first arrangement state provided by the first embodiment of the present application.
Figure 4:
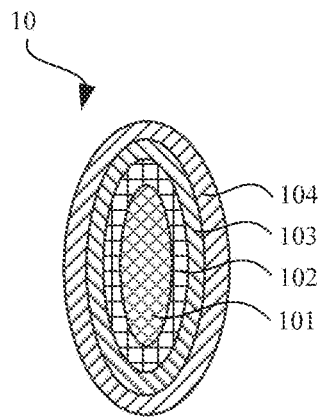
FIG. 4 is a schematic diagram of a cross-sectional structure of a nanocomposite particle provided by the first embodiment of the present application.

Please refer to FIGS. 2 to 4. FIG. 2 is a schematic structural diagram of the magnetron display device in a disorderly arrangement state provided by the first embodiment of the present application. FIG. 3 is a schematic structural diagram of the magnetron display device in the first arrangement state provided by the first embodiment of the present application. FIG. 4 is a schematic diagram of the cross-sectional structure of the nanocomposite particle provided by the first embodiment of the present application.

The first embodiment of the present application provides a magnetron display device 100, including a first substrate 11 and a second substrate 12 disposed oppositely. The magnetron display device 100 includes a dimming layer 10A disposed between the first substrate 11 and the second substrate 12. The dimming layer 10A includes a plurality of nanocomposite particles 10. Each of the nanocomposite particle 10 includes a magnetic core 101, and further includes a protection layer 102 and a luminescent layer 103 that sequentially cover the magnetic core 101. A length of the nanocomposite particle 10 in the long axis direction is different from a length of the nanocomposite particle in the short axis direction.

In the magnetron display device 100 provided by the first embodiment of the present application, the plurality of nanocomposite particles 10 are disposed in the dimming layer 10A. Each of the nanocomposite particle 10 includes the magnetic core 101, and further includes the protection layer 102 and the luminescent layer 103 that sequentially cover the magnetic core 101, and the length of the nanocomposite particle 10 in the long axis direction is different from the length of the nanocomposite particle 10 in the short axis direction. Under the stimulation of external light and the driving of external magnetic field, the arrangement orientation of the nanocomposite particles 10 can change with the change of the external magnetic field direction, so that the magnetic core 101 in the nanocomposite particle 10 is excited to emit partial color light. In the first embodiment, by coating a luminescent layer 103 outside the magnetic core 101, the luminescence color of the luminescent layer 103 and the luminescence color of the magnetic core 101 can be compounded, thereby enriching the luminescence color of the nanocomposite particle 10, so as to enrich display color of the dimming layer 10A and to broaden the gamut of the magnetron display device 100.

In the first embodiment of the present application, the nanocomposite particle 10 further includes another protection layer 104, covering the luminescent layer 103. It should be noted that, for the convenience of describing the embodiments of the present application, the protection layer 102 is defined as the first protection layer 102, and the other protection layer 104 is defined as the second protection layer 104.

In addition, the material and preparation method of the nanocomposite particle 10 in the first embodiment can refer to the description of the nanocomposite particle 20 in the foregoing embodiment, which will not be repeated here.

In the first embodiment of the present application, the magnetron display device 100 further includes a reflective layer 13 disposed on a side of the first substrate 11 close to the dimming layer 10A. This arrangement can improve the reflection effect of the magnetron display device 100.

It should be noted that the magnetron display device 100 in the present application may be a smart glass (electrochromic glass), a display panel, etc. Only the magnetron display device 100 as the smart glass is taken as an example in the first embodiment of the present application for illustration. However, the present application is not limited to this.

In the first embodiment of the present application, both the first substrate 11 and the second substrate 12 are glass substrates. The specific material of the glass substrate is selected according to actual application requirements, which is not limited to the present application.

Since the nanocomposite particle 10 is the optical material with dual response characteristics of magnetic response and light response, by adjusting the direction of the external magnetic field, the arrangement orientation of the nanocomposite particles 10 can be controlled to have different arrangement states, thereby exhibiting different optical properties.

In the first embodiment of the present application, when the nanocomposite particles 10 are in a disorderly arrangement state, the dimming layer 10A has a first transmittance, and the magnetron display device 100 is in an atomized state without displaying an image. When the nanocomposite particles 10 are in the first arrangement state, the dimming layer 10A has a second transmittance, and the magnetron display device 100 is in a non-atomized state with displaying a first image.

It should be noted that the first arrangement state in the present application may be a vertical arrangement state, a horizontal arrangement state or an oblique arrangement state. Only the first arrangement state as the vertical arrangement state is taken as an example for description in the first embodiment of the present application. However, the present application is not limited to this.

Specifically, when the external magnetic field is turned off, the nanocomposite particles 10 in the dimming layer 10A are in a disorderly and irregular arrangement. At this time, the nanocomposite particles 10 have a low transmittance to light, so that the first transmittance is low. Thus, the smart glass (electrochromic glass) is in an atomized state without displaying an image.

The specific size of the first transmittance is determined by factors such as material of the nanocomposite particles 10 and a wavelength of the incident light, and will not be repeated here.

When the external magnetic field is turned on, the nanocomposite particles 10 in the dimming layer 10A are in a vertical arrangement. At this time, the nanocomposite particles 10 have a high transmittance to light, so that the second transmittance is high. Thus, the smart glass is in a non-atomized state. In addition, by changing the direction of the magnetic field, the arrangement of the nanocomposite particles 10 can be changed, thereby changing the transmittance of the dimming layer 10A, so that the brightness of the smart glass can be adjusted.

In addition, under the stimulation of the incident light, by changing the direction of the magnetic field, the luminescence color of the nanocomposite particles 10 may change correspondingly based on the different arrangements thereof, so that the smart glass has different displayed colors. Compared with a single magnetic core 101, the nanocomposite particles 10 coated with the luminescent layer 103 enrich the luminescence color of the nanocomposite particles 10, thereby enriching the displayed images of the dimming layer 10A, and further broadening the colorfulness of the smart glass.

The specific size of the second transmittance is determined by factors such as the material of the nanocomposite particles 10, the arrangement orientation, and the wavelength of the incident light, and will not be repeated here.

It should be noted that when the external magnetic field is turned on, the nanocomposite particles 10 in the first embodiment of the present application may also have a second arrangement state, a third arrangement state, or a fourth arrangement state, etc., wherein the second arrangement state, the third arrangement state, or the fourth arrangement state is different from the first arrangement state. The arrangement state of the nanocomposite particles 10 can be changed by changing the direction of the magnetic field, so that the nanocomposite particles 10 have different transmission of light, and further have different displayed colors in different arrangements at the same time.

Further, in the first embodiment of the present application, the magnetron display device 100 is a reflective type, the incident light is natural light, and a side of the second substrate 12 away from the dimming layer 10A is a light incident side.

Specifically, when the external magnetic field is turned off, the nanocomposite particles 10 are in a disorderly arrangement state, and the transmittance of the dimming layer 10A to natural light is low, so that the smart glass is in an atomized state without displaying an image. When the magnetic field is turned on, the nanocomposite particles 10 have a first arrangement state, and under the irradiation of natural light, the nanocomposite particles 10 have different luminescence colors by adjusting the direction of the magnetic field, thereby enriching the display color of the smart glass, and realizing the control for displaying images of the smart glass.

In addition, based on the magnetic response characteristics of the nanocomposite particles 10, color displayed in the partial portion of the smart glass can be adjusted by changing the arrangement state of some nanocomposite particles 10. Thus, the adjustment for displaying images in the partial portion of the smart glass can be realized based on the actual application needs, thereby broadening the application of the smart glass.

Furthermore, since a backlight may be omitted in the reflective magnetron display device 100 in the first embodiment, the colorfulness of the display screen can be enriched while the power consumption of the display device can further be greatly reduced, thereby facilitating the improvement of the product competition in the market.

In the reflective magnetron display device 100 provided by the first embodiment of the present application, a plurality of nanocomposite particles 10 are provided in the dimming layer 10A. Each of the nanocomposite particles 10 includes a magnetic core 101, and further includes a protection layer and a luminescent layer 103 sequentially covering the magnetic core 101. A length of each of the nanocomposite particle 10 in the long axis direction is different from a length of each of the nanocomposite particle 10 in the short axis direction. Under the stimulation of external light and the driving of external magnetic field, the arrangement orientation of the nanocomposite particles 10 can change with the change of the direction of the external magnetic field, and then the magnetic core 101 in the nanocomposite particle 10 is excited to emit partial color light. In the present embodiment, with the luminescent layer 103, the luminescence color of the luminescent layer 103 and the luminescence color of the magnetic core 101 can be compounded, so as to enrich the luminescence color of the nanocomposite particles 10, thereby enriching the display color of the dimming layer 10A and broadening the gamut of the magnetron display device 100.

Figure 5:
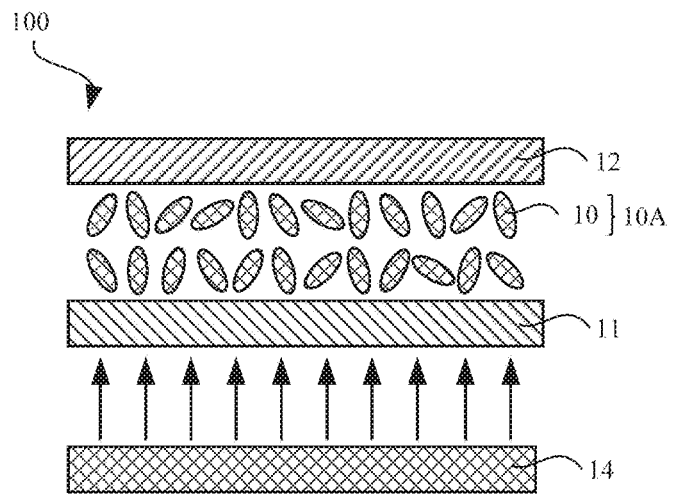
FIG. 5 is a schematic structural diagram of a magnetron display device in a disorderly arrangement state provided by a second embodiment of the present application.
Figure 6:
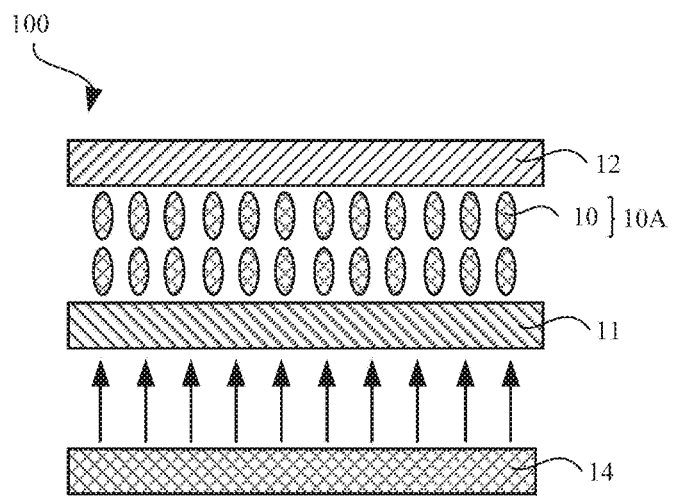
FIG. 6 is a schematic structural diagram of a magnetron display device in a first arrangement state provided by a second embodiment of the present application.

Please refer to FIGS. 5 and 6. FIG. 5 is a schematic structural diagram of a magnetron display device in a disorderly arrangement state provided by a second embodiment of the present application. FIG. 6 is a schematic structural diagram of a magnetron display device in a first arrangement state provided by the second embodiment of the present application.

The difference between the second embodiment of the present application and the first embodiment is that the magnetron display device 100 is a transmissive type, and to side of the first substrate 11 away from the dimming layer 10A is a light incident side. The magnetron display device 100 further includes a backlight unit 14 disposed on the light incident side. The backlight unit 14 includes a backlight source.

In the second embodiment of the present application, when material of the luminescent layer 103 is an up-conversion material, the light emitted by the backlight source is a combination of infrared light and/or visible light. The specific type of the light emitted by the backlight source can be selected based on the specific type of the up-conversion material, so as to maximize the absorption of the light energy by the nanocomposite particles 10, which can effectively improve the luminescence efficiency of the nanocomposite particles 10, thereby facilitating the improvement of the image quality of the magnetron display device 100.

When material of the luminescent layer 103 is quantum dot material, the light emitted by the backlight source is blue light. Due to the high absorption of blue light by quantum dot material, the incident light with blue light can effectively increase the luminescence efficiency of the nanocomposite particles 10, thereby improving the image quality of the magnetron display device 100.

Specifically, when the magnetic field is turned off, the nanocomposite particles 10 are in a disorderly arrangement state, and the transmittance of the dimming layer 10A is low. At this time, the smart glass is in an atomized state. Since there is no driving of the magnetic field, the smart glass does not display the image.

When the magnetic field is turned on, if the nanocomposite particles 10 are in a vertical arrangement state, most of the light emitted by the backlight source cannot pass through the nanocomposite particles 10. Thus, under the excitation of a small amount of backlight, the nanocomposite particles 10 themselves present a luminescence color, thereby enabling the magnetron display device 100 to display a corresponding image. If the nanocomposite particles 10 are arranged in an oblique or horizontal arrangement state, the light emitted by the backlight source can pass through the nanocomposite particles 10, and the light emitted by the backlight source can be compounded with the light emitted by the nanocomposite particles 10, thereby enriching the display color of the smart glass, which broadens the gamut of the smart glass.

Further, the specific arrangement of the nano composite particles 10 can be adjusted by adjusting the direction of the magnetic field, so that the nano composite particles 10 have different luminescence colors. Thus, the magnetron display device 100 can display different images.

In the transmissive magnetron display device 100 provided by the second embodiment of the present application, a plurality of nanocomposite particles 10 are provided in the dimming layer 10A. Each of the nanocomposite particles 10 includes a magnetic core 101, and further includes a protection layer and a luminescent layer 103 sequentially covering the magnetic core 101. A length of each of the nanocomposite particle 10 in the long axis direction is different from a length of each of the nanocomposite particle 10 in the short axis direction. Under the stimulation of external light and the driving of external magnetic field, the arrangement orientation of the nanocomposite particles 10 can change with the change of the direction of the external magnetic field, and then the magnetic core 101 in the nanocomposite particle 10 is excited to emit partial color light. In the present embodiment, by coating a luminescent layer 103 outside the magnetic core 101, the luminescence color of the luminescent layer 103 and the luminescence color of the magnetic core 101 can be compounded, so as to enrich the luminescence color of the nanocomposite particles 10, thereby enriching the display color of the dimming layer 10A and broadening the gamut of the magnetron display device 100.

In addition, compared to natural light, since the nanocomposite particle 10 have a higher absorption rate of light emitted by the backlight source, the image quality of the magnetron display device 100 can be greatly improved, thereby meeting the application requirements of the magnetron display in more scenes.

In the nanocomposite particle for magnetron luminescence provided by the embodiment of the present application, the first protection layer and the luminescent layer covers the magnetic core, and a length of the nanocomposite particle in the long axis direction is different from a length in the short axis direction. Accordingly, under the stimulation of external light and the driving of external magnetic field, the arrangement orientation of the nanocomposite particles can change with the change of the direction of the external magnetic field, and then the magnetic core in the nanocomposite particle is excited to emit partial color light. Compared to the nanocomposite particles in the prior art, in the present embodiment, by coating a luminescent layer outside the magnetic core, the luminescence color of the luminescent layer and the luminescence color of the magnetic core can be compounded, so as to enrich the luminescence color of the nanocomposite particle, thereby enriching the colorfulness of the nanocomposite particle applied to magnetron luminescence.

The embodiments of the present application are described in detail above, and specific examples are used herein to illustrate the principle and implementation of the present application The above embodiments are used only to help understand the methods and core ideas thereof of the present application; meanwhile, those skilled in the art may make changes in terms of embodiments and the scope of application based on the ideas of the present application. As mentioned above, the content of the description shall not be construed as a limitation to the present application.

What is claimed is:

1. A nanocomposite particle for magnetron luminescence, comprising: a magnetic core, and further comprising: a first protection layer, a luminescent layer, and a second protection layer sequentially covering the magnetic core, wherein a length of the nanocomposite particle in a long axis direction is different from a length of the nanocomposite particle in a short axis direction;
   material of the luminescent layer is up-conversion material;
   wherein a material of the second protection layer is phenol formaldehyde resin.

2. The nanocomposite particle for magnetron luminescence of claim 1, wherein material of the magnetic core is selected from magnetic material containing at least one of Fe, Ni, and Co; and
   material of the first protection layer is phenol formaldehyde resin or silicon dioxide.

3. The nanocomposite particle for magnetron luminescence of claim 2, wherein the material of the magnetic core is selected from magnetic material containing Fe.

4. The nanocomposite particle for magnetron luminescence of claim 3, wherein the material of the magnetic core is $Fe_3O_4$.

5. The nanocomposite particle for magnetron luminescence of claim 1, wherein a shape of the nanocomposite particle is rod-like, fusiform, or ellipsoidal.

6. A magnetron display device, comprising: a first substrate and a second substrate disposed oppositely, wherein the magnetron display device comprises a dimming layer disposed between the first substrate and the second substrate;
   wherein the dimming layer includes a plurality of nanocomposite particles, each of which includes a magnetic core, and further includes a protection layer and a luminescent layer sequentially covering the magnetic core, and a length of the nanocomposite particle in a long axis direction is different from a length of the nanocomposite particle in a short axis direction; and
   wherein when the nanocomposite particles are in a disorderly arrangement state, the dimming layer has a first transmittance, and the magnetron display device is in an atomized state without displaying an image; and
   when the nanocomposite particles are in a first arrangement state, the dimming layer has a second transmittance, and the magnetron display device is in a non-atomized state with displaying a first image.

7. The magnetron display device of claim 6, wherein material of the luminescent layer is up-conversion material or quantum dot material.

8. The magnetron display device of claim 6, wherein a shape of the nanocomposite particles is rod-like, fusiform, or ellipsoidal.

9. The magnetron display device of claim 5, wherein a side of the second substrate away from the dimming layer is a light incident side, and the magnetron display device further comprises a reflective layer which is disposed on a side of the first substrate close to the dimming layer.

10. The magnetron display device of claim 5, wherein a side of the first substrate away from the dimming layer is a light incident side, and
    the magnetron display device further comprises a backlight unit which is disposed on the light incident side.

11. The magnetron display device of claim 10, wherein the backlight unit includes a backlight source; and
    material of the luminescent layer is up-conversion material, and light emitted by the backlight source is a combination of infrared light and/or visible light; or
    material of the luminescent layer is a quantum dot material, and light emitted by the backlight source is blue light.

12. The magnetron display device of claim 6, wherein both of the first substrate and the second substrate are glass substrates.

* * * * *